US012621753B2

(12) United States Patent
Basu Mallick et al.

(10) Patent No.: US 12,621,753 B2
(45) Date of Patent: May 5, 2026

(54) MAINTAINING IN PARALLEL A FREQUENCY LAYER DURING CELL RESELECTION

(71) Applicant: Lenovo (Singapore) Pte. Ltd., New Tech Park (SG)

(72) Inventors: Prateek Basu Mallick, Dreieich (DE); Ravi Kuchibhotla, Chicago, IL (US); Joachim Loehr, Wiesbaden (DE); Genadi Velev, Darmstadt (DE); Hyung-Nam Choi, Ottobrunn (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 554 days.

(21) Appl. No.: 17/999,531

(22) PCT Filed: May 21, 2021

(86) PCT No.: PCT/IB2021/054455
§ 371 (c)(1),
(2) Date: Nov. 21, 2022

(87) PCT Pub. No.: WO2021/234672
PCT Pub. Date: Nov. 25, 2021

(65) Prior Publication Data
US 2023/0121583 A1 Apr. 20, 2023

Related U.S. Application Data

(60) Provisional application No. 63/028,511, filed on May 21, 2020.

(51) Int. Cl.
*H04W 48/12* (2009.01)
*H04W 48/18* (2009.01)
(Continued)

(52) U.S. Cl.
CPC ........... *H04W 48/12* (2013.01); *H04W 48/18* (2013.01); *H04W 72/0453* (2013.01); *H04W 72/56* (2023.01)

(58) Field of Classification Search
None
See application file for complete search history.

(56) References Cited

U.S. PATENT DOCUMENTS

| | | | |
|---|---|---|---|
| 5,794,146 A | 8/1998 | Sevcik et al. | |
| 2010/0323698 A1 | 12/2010 | Rune et al. | |

(Continued)

FOREIGN PATENT DOCUMENTS

EP 3474603 A1 4/2019

OTHER PUBLICATIONS

PCT/IB2021/054455, "Notification of Transmittal of the International Search Report and the Written Opinion of the International Searching Authority, or the Declaration", International Searching Authority, Aug. 31, 2021, pp. 1-28.

(Continued)

*Primary Examiner* — Robert M Morlan
(74) *Attorney, Agent, or Firm* — Kunzler Needham & Hilton

(57) ABSTRACT

Apparatuses, methods, and systems are disclosed for performing cell selection/reselection on a radio frequency associated with a network slice. One apparatus includes a processor and a transceiver that camps on a first frequency layer of a RAN while in a RRC idle state, the first frequency layer supporting a first set of network slices, where the first set of network slices is prioritized for use with a first frequency. The processor iteratively performs cell search on a second frequency layer while the apparatus is camped on the first frequency layer, the second frequency layer supporting a second set of network slices, where the second set (Continued)

600

Start

605 — Configure the UE to use a first set of network slices and a second set of network slices 610 — Camp on a first frequency layer of a RAN while in a RRC Idle state, the first frequency layer supporting the first set of network slices, where the first set of network slices is prioritized for use with a first frequency 615 — Iteratively perform cell search on a second frequency layer while the UE is camped on the first frequency layer, the second frequency layer supporting the second set of network slices, where the second set of network slices is prioritized for use with a second frequency 620 — Maintain in parallel the second frequency layer while in the RRC Idle state by performing cell reselection on the second frequency End of network slices is prioritized for use with a second frequency. The processor maintains in parallel the second frequency layer while in the RRC idle state.

18 Claims, 7 Drawing Sheets

(51) Int. Cl.
H04W 72/0453 (2023.01)
H04W 72/56 (2023.01)

(56) References Cited

U.S. PATENT DOCUMENTS

| | | | |
|---|---|---|---|
| 2020/0120547 A1 | 4/2020 | Han et al. | |
| 2021/0345204 A1* | 11/2021 | Matolia | H04W 36/125 |
| 2021/0360714 A1* | 11/2021 | Zhang | H04L 41/5051 |
| 2022/0394608 A1* | 12/2022 | Luo | H04L 45/306 |

OTHER PUBLICATIONS

PCT/IB2021/054456, "Notification of Transmittal of the International Search Report and the Written Opinion of the International Searching Authority, or the Declaration", International Searching Authority, Aug. 25, 2021, pp. 1-15.
Intel Corp., "Potential solution and analysis for multicarrier load distribution", 3GPP TSG RAN WG2 Meeting #89bis R2-151185, Apr. 20-24, 2015, pp. 1-7.
Huawei et al., "Slice Availability for Cell Reselection", 3GPP TSG-RAN WG2 Meeting#101 R2-1802261, Feb. 26 Mar. 2, 2018, pp. 1-3.

Gemalto N.V., "Considering slice availability for inter-frequency cell re-selection", 3GPP TSG-RAN WG2 Meeting #101 R2-1802543, Feb. 26-Mar. 2, 2018, pp. 1-3.
Huawei, "Slice aware Idle mode mobility", 3GPP TSG-RAN3 Meeting #99bis R3-181895, Apr. 16-20, 2018, pp. 1-2.
CMCC, "Allowed NSSAI Indication to NG-RAN", 3GPP TSG-RAN WG3 #99bis R3-182009, Apr. 16-20, 2018, pp. 1-3.
China Telecomm, "On Allowed NSSAI Usage", 3GPP TSG-RAN WG3#100 R3-182925, May 21-25, 2018, pp. 1-3.
Motorola Mobility et al., "KI #7, New Sol: Preferred frequency bands in Configured NSSAI", 3GPP TSG-SA WG2 Meeting #139 E (e-meeting) S2-2004207, Jun. 1-12, 2020, pp. 1-3.
Lenovo et al., "KI #7, Sol #30: Update to remove Ed. Notes", 3GPP TSG-SA WG2 Meeting #140 E (e-meeting) 82-2005182, Aug. 19-Sep. 2, 2020, pp. 1-3.
3GPP, "3rd Generation Partnership Project; Technical Specification Group Services and System Aspects; System architecture for the 5G System (5GS); Stage 2 (Release 16)", 3GPP TS 23.501 V16.3.0, Dec. 2019, pp. 1-417.
3GPP, "3rd Generation Partnership Project; Technical Specification Group Services and System Aspects; Procedures for the 5G System (5GS); Stage 2 (Release 16)", 3GPP TS 23.502 V16.3.0, Dec. 2019, pp. 1-558.
3GPP, "3rd Generation Partnership Project; Technical Specification Group Services and System Aspects; Policy and charging control framework for the 5G System (5GS); Stage 2 (Release 16)", 3GPP TS 23.503 V16.3.0, Dec. 2019, pp. 1-112.
3GPP, "3rd Generation Partnership Project; Technical Specification Group Radio Access Network; NR; Base Station (BS) radio transmission and reception (Release 16)", 3GPP TS 38.104 V16.2.0, Dec. 2019, pp. 1-239.
3GPP, "3rd Generation Partnership Project; Technical Specification Group Radio Access Network; NR; Radio Resource Control (RRC) protocol specification (Release 15)", 3GPP TS 38.331 V15.8.0, Dec. 2019, pp. 1-532.

* cited by examiner

700

Start

705   Receive a broadcast message comprising a persistence check value for a first cell 710   Generate a random value during a cell reselection procedure 715   Compare the generated random value to the persistence check value 720   Selectively stop the cell reselection based on a result of the comparison End

MAINTAINING IN PARALLEL A FREQUENCY LAYER DURING CELL RESELECTION

CROSS-REFERENCE TO RELATED APPLICATIONS

This application claims priority to U.S. Provisional Patent Application No. 63/028,510 entitled "NETWORK-AS-SISTED OPTIMAL SLICE SELECTION IN 5G SYSTEM" and filed on May 21, 2020 for Prateek Basu Mallick, Ravi Kuchibhotla, Joachim Loehr, Hyung-Nam Choi, and Genadi Velev, which application is incorporated herein by reference. This application also claims priority to U.S. Provisional Patent Application No. 63/028,511 entitled "UE-BASED OPTIMAL SLICE SELECTION IN 5G SYSTEM" and filed on May 21, 2020 for Prateek Basu Mallick, Ravi Kuchib-hotla, Joachim Loehr, Genadi Velev, and Hyung-Nam Choi, which application is incorporated herein by reference.

FIELD

The subject matter disclosed herein relates generally to wireless communications and more particularly relates to performing cell selection/reselection on a radio frequency associated with a network slice.

BACKGROUND

In certain wireless communication systems, a network operator may prefer that a user equipment ("UE") camp on a cell on a first carrier providing coverage, but establish a Radio Resource Control ("RRC") Connection on a different cell on a second carrier supporting Slice 'x' (alternatively, supporting service 'x') with minimum delay as soon upper layers initiate a Service Request procedure for the Slice/service 'x.' However, monitoring separate radio carriers increases power consumption at the UE.

BRIEF SUMMARY

Disclosed are procedures for performing cell selection/reselection on a radio frequency associated with a network slice. Said procedures may be implemented by apparatus, systems, methods, or computer program products.

One method of a User Equipment device ("UE") includes configuring the UE to use a first set of network slices and a second set of network slices and camping on a first fre-quency layer of a Radio Access Network ("RAN") while in a Radio Resource Control ("RRC") Idle state, the first frequency layer supporting the first set of network slices, wherein the first set of network slices is prioritized for use with a first frequency. The first method includes iteratively performing cell search on a second frequency layer while the UE is camped on the first frequency layer, the second frequency layer supporting the second set of network slices, wherein the second set of network slices is prioritized for use with a second frequency layer. The first method includes maintaining in parallel the second frequency layer while in the RRC Idle state by performing cell reselection on the second frequency.

Another method of a UE includes receiving a broadcast message comprising a persistence check value for a first cell and generating a random value during a cell reselection procedure. The second method includes comparing the gen-erated random value to the persistence check value and selectively stopping the cell reselection based on a result of the comparison.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
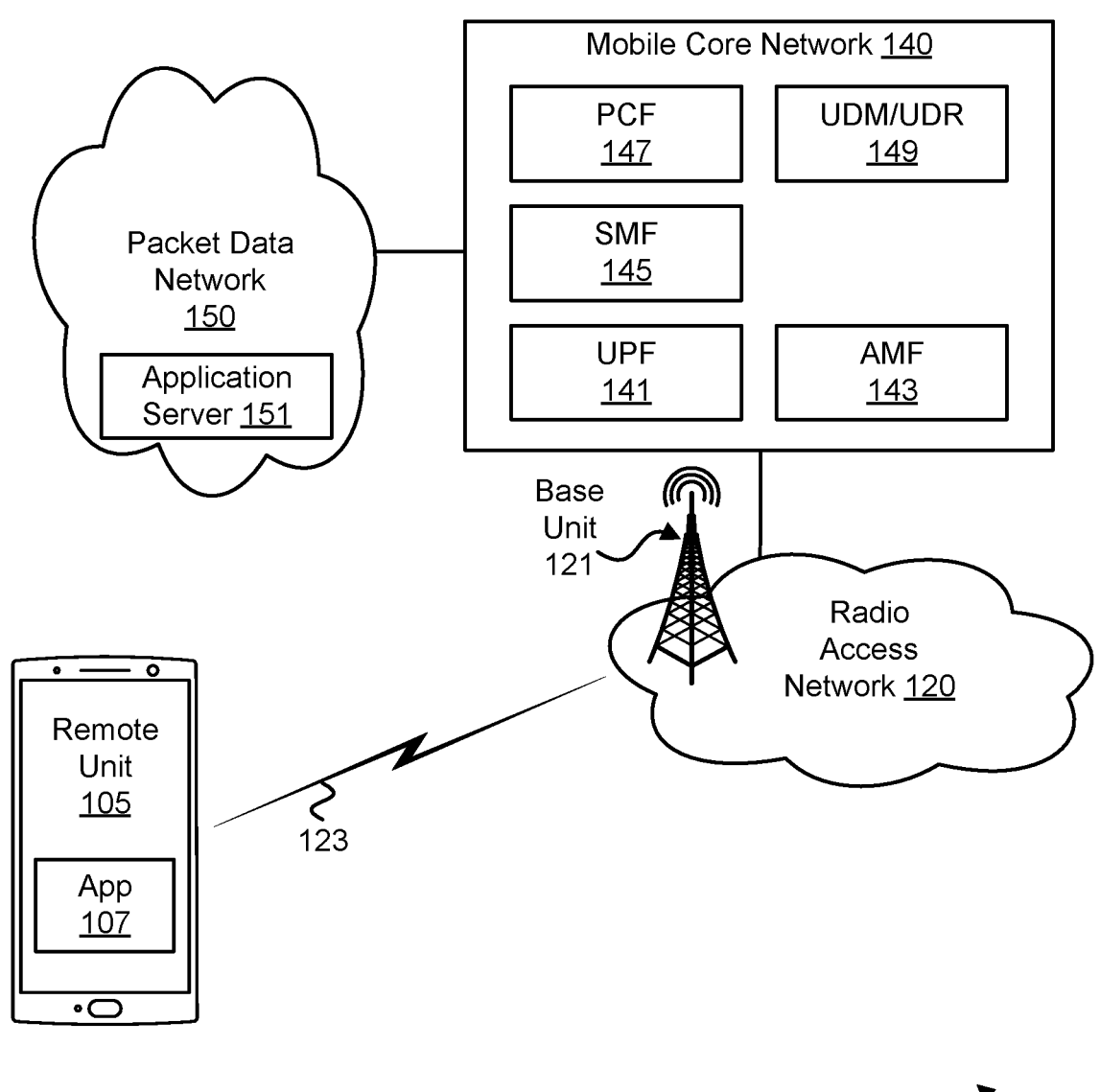
FIG. 1 is a schematic block diagram illustrating one embodiment of a wireless communication system for per-forming cell selection/reselection on a radio frequency asso-ciated with a network slice.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be imple-mented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a pro-gram product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for performing cell selection/reselection on a radio frequency associated with a network slice. A mobile communication network operator may prefer that a User Equipment ("UE") camp on a cell on carrier 'f1' providing coverage but establish an RRC Connection on a different cell on carrier 'f2' supporting Slice/ service 'x' with minimum delay as soon upper layers initiate a Service Request procedure for the Slice/ service 'x'. From a UE perspective, it will be essential to minimize power consumption during the above procedure while ensuring the best user experience.

In some embodiments, the UE receives a list of frequencies for each of the slices in the allowed slice list when successfully registering to the network and/or the UE receives a list of supported frequencies for each of the slices in the rejected slice list when successfully (or otherwise) registering to the network. Note that a frequency for a network slice may be within a different radio band (i.e., defined frequency range) than the radio band of the serving cell. Accordingly, a "frequency for a network slice" as used herein refers to a frequency/band combination (e.g., as defined in 3GPP TS 38.104). In certain embodiments, the radio band may be implied. In other embodiments, the radio band may be explicitly indicated.

However, a UE in 'mode d' operation (as described in 3GPP TS 23.501, section 5.15.9) may not include a NSSAI (Slice info) while initiating the registration procedure. Additionally, the above embodiments do not help for initial cell selection case when the UE has not yet registered in the current network. Further, the above embodiments do not work if the network does not provide the said slice/frequency mapping as a result (i.e., output) of the registration procedure.

Apart from the above demerits, if the slice/frequency mapping (provided during the registration procedure) is not homogeneous across the entire registration area (i.e., Tracking Areas ("TA") list signaled to the UE), then the UE upon moving to other parts in the provided TA list cannot be sure if it can still find the Slice supported on the indicated frequency. Here, the registration area may be indicated by a TA list signaled to the UE.

In certain embodiments, the network may indicate a frequency for a network slice using a RedirectedCarrierInfo in RRCRelease message (e.g., according to 3GPP TS 38.331). However, such messaging is only applicable for RRC Connected UEs. Moreover, signaling RedirectedCarrierInfo in RRCRelease message is typically used due to cell congestion situation. Therefore, it will not guarantee that the redirection is indeed for slice/service reason.

The below described solutions remove dependency on UE NAS registration procedures to signal frequency for a network slice. The below described solutions also remove the uncertainty around existing dedicated as well as broadcast solutions by developing new signaling, a new procedure and even by implementing UE based solutions.

In various embodiments, cell-selection is improved by the UE initiates frequency scan and camping on a frequency corresponding to a frequency that it assumes (pre-configured) supports the most desired/preferred slice. In various embodiments, cell-reselection is improved by parallel maintenance on a second frequency.

In some embodiments, improved cell reselections may need to be used when Cell(s) on carrier 'f2' controls not only cell access to establish RRC Connection but also (or only) cell camping since it wants to control the RRC Idle state UE load which can arise due to: The network can mitigate this by e.g., Broadcasting a persistence check parameter. Cell (re)selection on the cell on frequency 'f2' also includes this persistence check. A UE generates a random number between 0 and 1, and only when this number is smaller than the broadcasted persistence check, UE proceeds on to (re) select this cell.

FIG. 1 depicts a wireless communication system 100 for performing cell selection/reselection on a radio frequency associated with a network slice, according to embodiments of the disclosure. In one embodiment, the wireless communication system 100 includes at least one remote unit 105, a radio access network ("RAN") 120, and a mobile core network 140. The RAN 120 and the mobile core network 140 form a mobile communication network. The RAN 120 may be composed of a base unit 121 with which the remote unit 105 communicates using wireless communication links 123. Even though a specific number of remote units 105, base units 121, wireless communication links 123, RANs 120, and mobile core networks 140 are depicted in FIG. 1, one of skill in the art will recognize that any number of remote units 105, base units 121, wireless communication links 123, RANs 120, and mobile core networks 140 may be included in the wireless communication system 100.

In one implementation, the RAN 120 is compliant with the 5G system specified in the Third Generation Partnership Project ("3GPP") specifications. For example, the RAN 120 may be a Next Generation Radio Access Network ("NG-RAN"), implementing New Radio ("NR") Radio Access Technology ("RAT") and/or Long-Term Evolution ("LTE") RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

The remote units 105 may communicate directly with one or more of the base units 121 in the RAN 120 via uplink ("UL") and downlink ("DL") communication signals. Furthermore, the UL and DL communication signals may be carried over the wireless communication links 123. Here, the RAN 120 is an intermediate network that provides the remote units 105 with access to the mobile core network 140. As described in greater detail below, the base unit(s) 121 may provide a cell operating using a first carrier frequency and/or a cell operating using a second frequency. Cells using the first carrier frequency may form a first frequency layer, while cells using the second carrier frequency may form a second frequency layer.

In some embodiments, the remote units 105 communicate with an application server 151 via a network connection with the mobile core network 140. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 140 via the RAN 120. The mobile core network 140 then relays traffic between the remote unit 105 and the application server 151 in the packet data network 150 using the PDU session. The PDU session represents a logical connection between the remote unit 105 and the User Plane Function ("UPF") 141.

In order to establish the PDU session (or PDN connection), the remote unit 105 must be registered with the mobile core network 140 (also referred to as "attached to the mobile core network" in the context of a Fourth Generation ("4G") system). Note that the remote unit 105 may establish one or more PDU sessions (or other data connections) with the mobile core network 140. As such, the remote unit 105 may have at least one PDU session for communicating with the packet data network 150. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 141. A PDU Session supports one or more Quality of Service ("QoS") Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a Packet Data Network ("PDN") connection (also referred to as EPS session) provides E2E UP connectivity between the remote unit and a PDN. The PDN connectivity procedure establishes an EPS Bearer, i.e., a tunnel between the remote unit 105 and a Packet Gateway ("PGW", not shown) in the mobile core network 140. In certain embodiments, there is a one-to-one mapping between an EPS Bearer and a QoS profile, such that all packets belonging to a specific EPS Bearer have the same QoS Class Identifier ("QCI").

The base units 121 may be distributed over a geographic region. In certain embodiments, a base unit 121 may also be referred to as an access terminal, an access point, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a relay node, a RAN node, or by any other terminology used in the art. The base units 121 are generally part of a RAN, such as the RAN 120, that may include one or more controllers communicably coupled to one or more corresponding base units 121. These and other elements of radio access network are not illustrated but are well known generally by those having ordinary skill in the art. The base units 121 connect to the mobile core network 140 via the RAN 120.

The base units 121 may serve a number of remote units 105 within a serving area, for example, a cell or a cell sector, via a wireless communication link 123. The base units 121 may communicate directly with one or more of the remote units 105 via communication signals. Generally, the base units 121 transmit DL communication signals to serve the remote units 105 in the time, frequency, and/or spatial domain. Furthermore, the DL communication signals may be carried over the wireless communication links 123. The wireless communication links 123 may be any suitable carrier in licensed or unlicensed radio spectrum. The wireless communication links 123 facilitate communication between one or more of the remote units 105 and/or one or more of the base units 121. Note that during NR operation on unlicensed spectrum (referred to as "NR-U"), the base unit 121 and the remote unit 105 communicate over unlicensed (i.e., shared) radio spectrum.

In one embodiment, the mobile core network 140 is a 5GC or an Evolved Packet Core ("EPC"), which may be coupled to a packet data network 150, like the Internet and private data networks, among other data networks. A remote unit 105 may have a subscription or other account with the mobile core network 140. In various embodiments, each mobile core network 140 belongs to a single mobile network operator ("MNO"). The present disclosure is not intended to be limited to the implementation of any particular wireless communication system architecture or protocol.

The mobile core network 140 includes several network functions ("NFs"). As depicted, the mobile core network 140 includes at least one UPF 141. The mobile core network 140 also includes multiple control plane ("CP") functions including, but not limited to, an Access and Mobility Management Function ("AMF") 143 that serves the RAN 120, a Session Management Function ("SMF") 145, a Policy Control Function ("PCF") 147, a Unified Data Management function ("UDM") and a User Data Repository ("UDR"). Although specific numbers and types of network functions are depicted in FIG. 1, one of skill in the art will recognize that any number and type of network functions may be included in the mobile core network 140.

The UPF(s) 141 is/are responsible for packet routing and forwarding, packet inspection, QoS handling, and external PDU session for interconnecting Data Network (DN), in the 5G architecture. The AMF 143 is responsible for termination of NAS signaling, NAS ciphering & integrity protection, registration management, connection management, mobility management, access authentication and authorization, security context management. The SMF 145 is responsible for session management (i.e., session establishment, modification, release), remote unit (i.e., UE) IP address allocation & management, DL data notification, and traffic steering configuration of the UPF 141 for proper traffic routing.

The PCF 147 is responsible for unified policy framework, providing policy rules to CP functions, access subscription information for policy decisions in UDR. The UDM is responsible for generation of Authentication and Key Agreement ("AKA") credentials, user identification handling, access authorization, subscription management. The UDR is a repository of subscriber information and can be used to service a number of network functions. For example, the UDR may store subscription data, policy-related data, subscriber-related data that is permitted to be exposed to third party applications, and the like. In some embodiments, the UDM is co-located with the UDR, depicted as combined entity "UDM/UDR" 149.

In various embodiments, the mobile core network 140 may also include a Network Repository Function ("NRF") (which provides NF service registration and discovery, enabling NFs to identify appropriate services in one another and communicate with each other over Application Programming Interfaces ("APIs")), a Network Exposure Function ("NEF") (which is responsible for making network data and resources easily accessible to customers and network partners), an Authentication Server Function ("AUSF"), or other NFs defined for the 5GC. When present, the AUSF may act as an authentication server and/or authentication proxy, thereby allowing the AMF 143 to authenticate a remote unit 105. In certain embodiments, the mobile core network 140 may include an authentication, authorization, and accounting ("AAA") server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. A network instance may be identified by a single-network slice selection assistance information ("S-NSSAI") while a set of network slices for which the remote unit 105 is authorized to use is identified by network slice selection assistance information ("NSSAI"). Here, "NSSAI" refers to a vector value including one or more S-NSSAI values. In certain embodiments, the various network slices may include separate instances of network functions, such as the SMF 145 and UPF 141. In some embodiments, the different network slices may share some common network functions, such as the AMF 143. The different network slices are not shown in FIG. 1 for ease of illustration, but their support is assumed. In various embodiments, a first set of set of network slices may be prioritized for use with a first carrier frequency, while a second set of network slices may be prioritized for use with a second carrier frequency.

While FIG. 1 depicts components of a 5G RAN and a 5G core network, the described embodiments for performing cell selection/reselection on a carrier frequency associated with a network slice apply to other types of communication networks and RATs, including IEEE 802.11 variants, Global System for Mobile Communications ("GSM", i.e., a 2G digital cellular network), General Packet Radio Service ("GPRS"), Universal Mobile Telecommunications System ("UMTS"), LTE variants, CDMA 2000, Bluetooth, ZigBee, Sigfox, and the like.

Moreover, in an LTE variant where the mobile core network 140 is an EPC, the depicted network functions may be replaced with appropriate EPC entities, such as a Mobility Management Entity ("MME"), a Serving Gateway ("SGW"), a PGW, a Home Subscriber Server ("HSS"), and the like. For example, the AMF 143 may be mapped to an MME, the SMF 145 may be mapped to a control plane portion of a PGW and/or to an MME, the UPF 141 may be mapped to an SGW and a user plane portion of the PGW, the UDM/UDR 149 may be mapped to an HSS, etc.

In the following descriptions, the term "RAN node" is used for the base station but it is replaceable by any other radio access node, e.g., gNB, eNB, Base Station ("BS"), Access Point ("AP"), etc. Further, the operations are described mainly in the context of 5G NR. However, the proposed solutions/methods are also equally applicable to other mobile communication systems supporting cell selection/reselection on a carrier frequency associated with a network slice.

Figure 2:
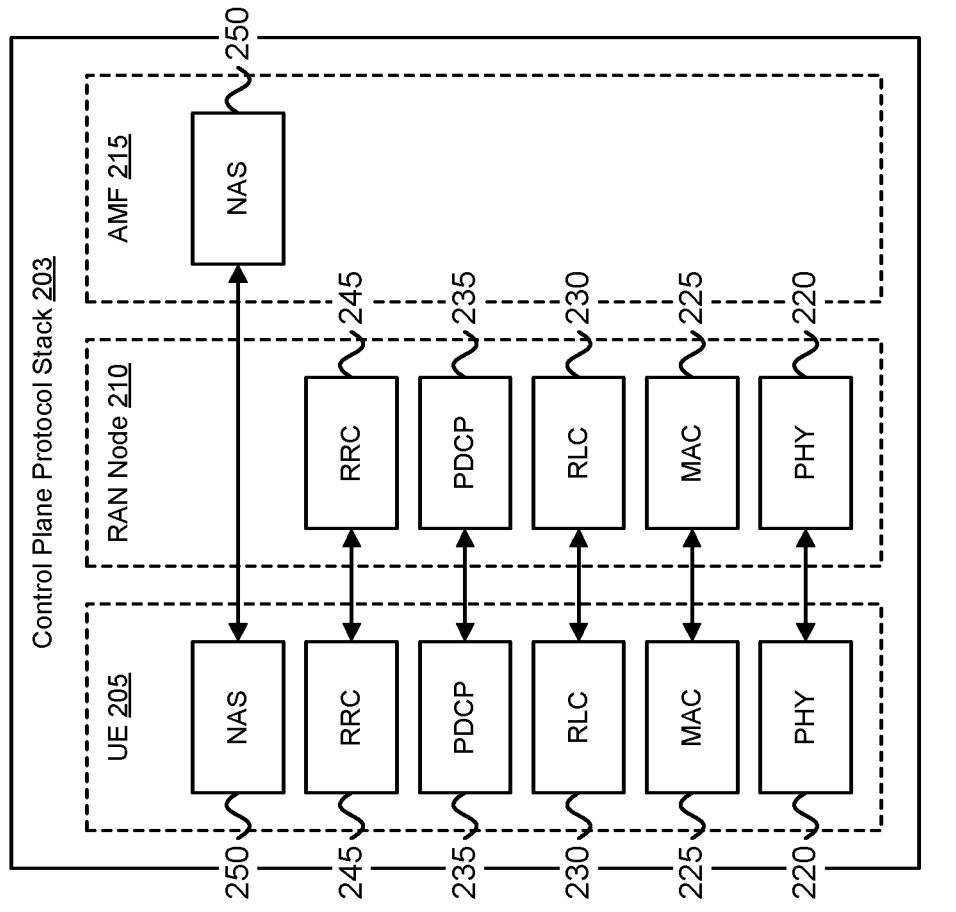
FIG. 2 is a block diagram illustrating one embodiment of a 5G New Radio ("NR") protocol stack.
Figure 2:
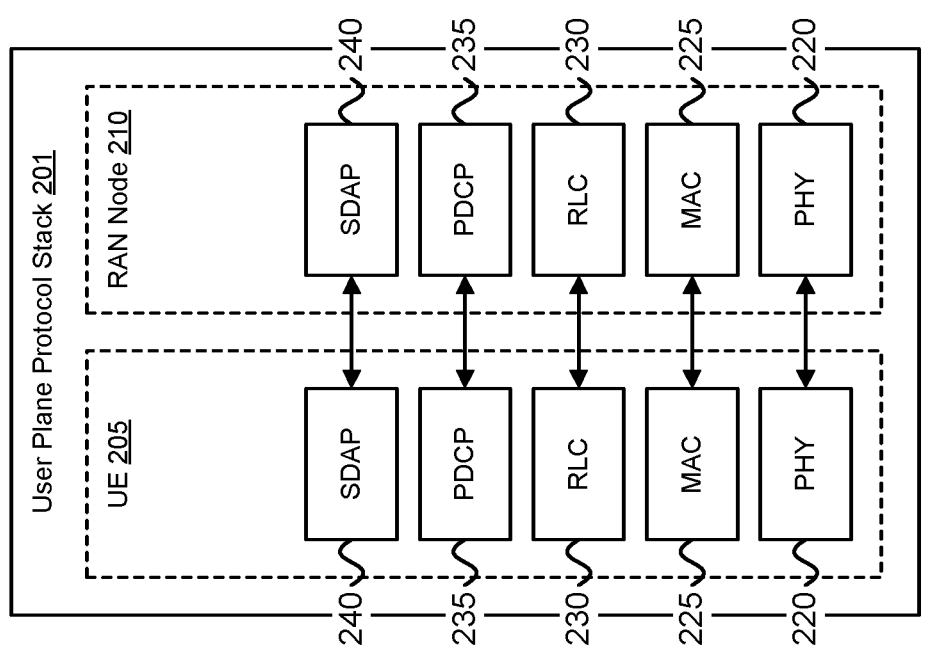

FIG. 2 depicts a NR protocol stack 200, according to embodiments of the disclosure. While FIG. 2 shows the UE 205, the RAN node 210 and an AMF 215 in a 5G core network ("5GC"), these are representative of a set of remote units 105 interacting with a base unit 121 and a mobile core network 140. As depicted, the protocol stack 200 comprises a User Plane protocol stack 201 and a Control Plane protocol stack 203. The User Plane protocol stack 201 includes a physical ("PHY") layer 220, a Medium Access Control ("MAC") sublayer 225, the Radio Link Control ("RLC") sublayer 230, a Packet Data Convergence Protocol ("PDCP") sublayer 235, and Service Data Adaptation Protocol ("SDAP") layer 240. The Control Plane protocol stack 203 includes a physical layer 220, a MAC sublayer 225, a RLC sublayer 230, and a PDCP sublayer 235. The Control Plane protocol stack 203 also includes a Radio Resource Control ("RRC") layer 245 and a Non-Access Stratum ("NAS") layer 250.

The AS layer (also referred to as "AS protocol stack") for the User Plane protocol stack 201 consists of at least SDAP, PDCP, RLC and MAC sublayers, and the physical layer. The AS layer for the Control Plane protocol stack 203 consists of at least RRC, PDCP, RLC and MAC sublayers, and the physical layer. The Layer-2 ("L2") is split into the SDAP, PDCP, RLC and MAC sublayers. The Layer-3 ("L3") includes the RRC sublayer 245 and the NAS layer 250 for the control plane and includes, e.g., an Internet Protocol ("IP") layer and/or PDU Layer (not depicted) for the user plane. L1 and L2 are referred to as "lower layers," while L3 and above (e.g., transport layer, application layer) are referred to as "higher layers" or "upper layers."

The physical layer 220 offers transport channels to the MAC sublayer 225. The physical layer 220 may perform a Clear Channel Assessment and/or Listen-Before-Talk ("CCA/LBT") procedure using energy detection thresholds, as described herein. In certain embodiments, the physical layer 220 may send a notification of UL Listen-Before Talk ("LBT") failure to a MAC entity at the MAC sublayer 225.

The MAC sublayer 225 offers logical channels to the RLC sublayer 230. The RLC sublayer 230 offers RLC channels to the PDCP sublayer 235. The PDCP sublayer 235 offers radio bearers to the SDAP sublayer 240 and/or RRC layer 245. The SDAP sublayer 240 offers QoS flows to the core network (e.g., 5GC). The RRC layer 245 provides for the addition, modification, and release of Carrier Aggregation and/or Dual Connectivity. The RRC layer 245 also manages the establishment, configuration, maintenance, and release of Signaling Radio Bearers ("SRBs") and Data Radio Bearers ("DRBs").

The NAS layer 250 is between the UE 205 and the 5GC 215. NAS messages are passed transparently through the RAN. The NAS layer 250 is used to manage the establishment of communication sessions and for maintaining continuous communications with the UE 205 as it moves between different cells of the RAN. In contrast, the AS layer is between the UE 205 and the RAN (i.e., RAN node 210) and carries information over the wireless portion of the network.

Figure 3:
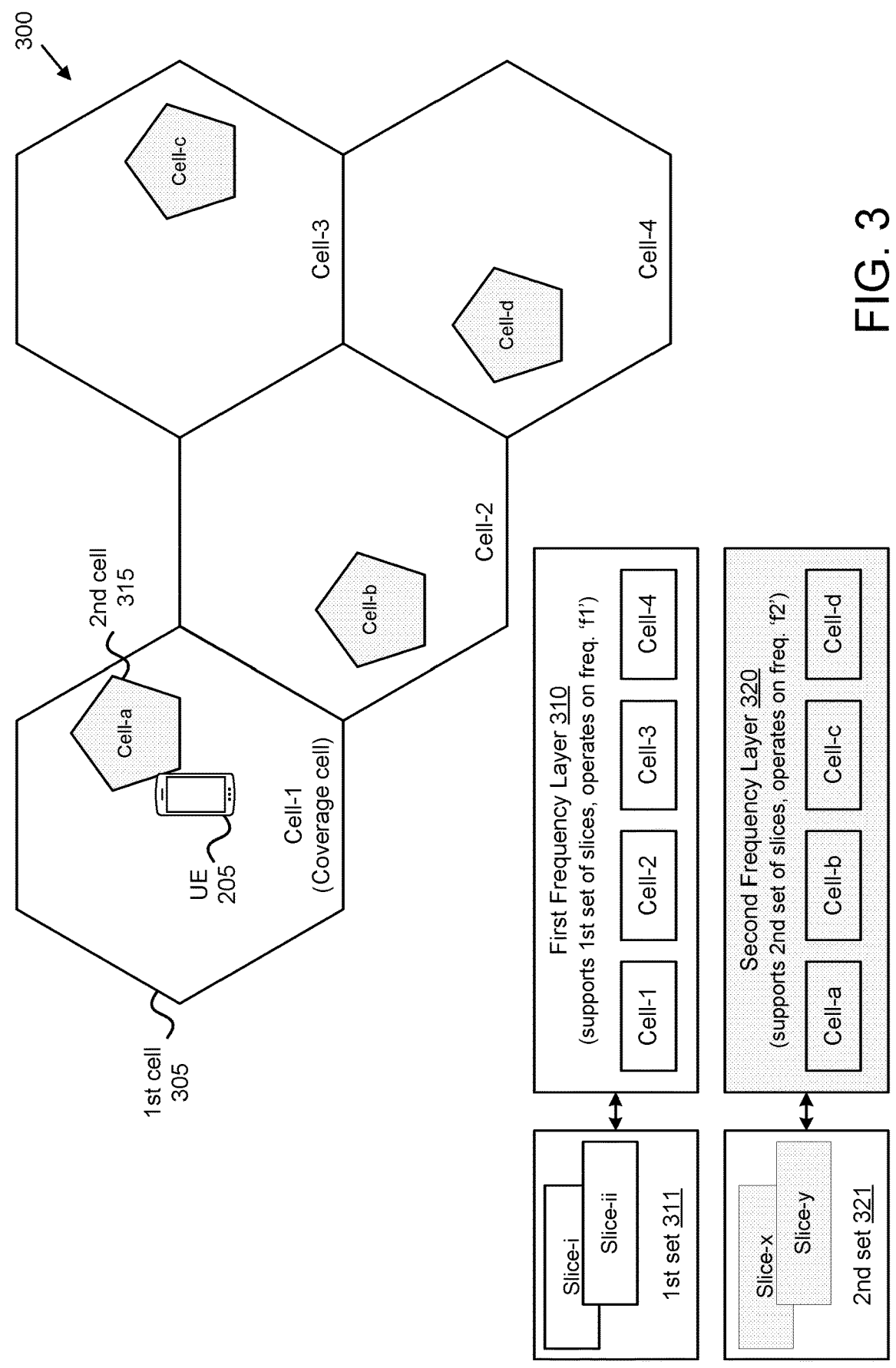
FIG. 3 is a diagram illustrating one embodiment of a RAN deployment.

FIG. 3 depicts an example network deployment 300 of a RAN portion of mobile communication network, according to embodiments of the disclosure. The RAN 301 may support multiple frequency layers, as described below in further detail. In the depicted embodiment, the UE 205 is in the coverage area of a first cell 305 which operates on a first frequency. Here, the first cell 305 is part of a first frequency layer 310 which supports a first set of network slices 311. For example, a slice that supports a first service T (depicted as "slice-i") and a slice that supports a second service 'ii' (depicted as "slice-ii") may be part of the first set of network slices 311. The first cell 305 may be representative of any cell on the first frequency layer 310.

As shown, the UE 205 is also within the coverage area of a second cell 315 which operates on a second frequency different than the first frequency. Here, the second cell 315 is part of a second frequency layer 320 which supports a second set of network slices 321, different than the first set 311. For example, a slice that supports a first service 'x' (depicted as "slice-x") and a slice that supports a second service 'y' (depicted as "slice-y") may be part of the second set of network slices 321. Here, the second cell 315 may be representative of any cell on the second frequency layer 320.

In one embodiment, the first frequency layer 310 does not support any of the second set of network slices 321. In other embodiments, the cells of the first frequency layer 310 may support one or more of the slices in the second set of network slices 321; however, the mobile communication network may prefer that the slices of the second set of network slices 321 be used in the second frequency, where possible, for example if the priority of the second set of network slices is higher when being served on the second frequency layer. The priority for a set of network slices can be either determined in the UE based on implementation including user inputs or the same can be signaled by the network using RRC or NAS signaling. In addition to this among the slices subscribed by the UE or allowed by the network for a given UE, some slice may have higher priority than others and therefore a UE may perform cell (re)selection to able to cater to the most preferred/prioritized slices. If the higher (or most) prioritized/preferred slices are better served on different frequency layers, the UE maintains parallel mobility on those two layers.

In the depicted embodiment, it is assumed that the network operator prefers that the UE 205 camp on a carrier of the first frequency layer 310, e.g., due to the first frequency layer providing a greater geographic coverage. As used herein, "camping" refers to behavior of the UE 205 in the RRC Idle state where the UE 205 has selected a cell and is prepared to initiate a RRC connection, receive paging and receive a broadcast service. Note that while in the RRC Idle state, the UE 205 is switched on but does not have any established RRC connection with the mobile communication network.

In some embodiments, when the UE 205 transitions from the RRC connected state to the RRC idle state, the UE 205 selects a cell to camp on. This cell may be a cell on a frequency that is indicated in an RRC connection release message. When camping on a cell, the UE 205 may monitor and receive system information that is broadcast in the cell. Further, the UE 205 may perform cell reselection while camping on the coverage cell.

However, the UE 205 may have a preferred slice (also referred to as a 'desired' slice) that is part of the second set of network slices 321. As used herein, a "preferred slice" or "desired slice" refers to a slice that is part of allowed slice list, rejected slice list, configured slice list, etc. In various embodiments, the mobile communication network knows about the "desired" slice list, e.g., based on a registration procedure performed by the UE 205. In various embodiments, the UE 205 assumes that the first entry in a dedicated signaled cellReselectionPriorities list corresponds to its most desired Slice. For example, the most desired slice may be a highest priority slice.

In order to minimize delay in connecting to the second cell 315, the UE 205 performs parallel maintenance of the second frequency layer 320. Thus, even though the UE 205 considers itself to be camped on the first frequency layer (e.g., frequency 'f1'), whenever the UE 205 requires a connection for data coming from the upper layers for the service 'x', the parallel maintenance allows the UE 205 to very quickly establish an RRC connection with the second cell 315. To conserve power, the UE 205 should not be required to continuously monitor the first frequency layer (i.e., frequency 'f2'). The solutions described below provide optimization between power consumption at the UE 205 (which is camping on cell 305) and a time to establish a RRC connection with the second cell 315.

The first frequency layer 310 is a collection of cells (or cell sectors) that operate on the same carrier frequency, i.e., the first frequency 'f1'. In the depicted embodiment, the first frequency layer includes the following cells: cell-1, cell-2, cell-3, and cell-4. Here, the first set of network slices 311 is prioritized for use with frequency 'f1'. Therefore, the UE 205 may be configured to camp on the first frequency layer 310 when within a certain geographic area. In some embodiments, the geographic coverage area of cells in the first frequency layer 310 may be contiguous.

The second frequency layer 320 is a second collection of cells (or cell sectors) that operate on the same carrier frequency, i.e., the second frequency 'f2'. In the depicted embodiment, the first frequency layer includes the following cells: cell-a, cell-b, cell-c, and cell-d. Here, the second set of network slices 321 is prioritized for use with frequency 'f2'. In the depicted embodiment, the geographic coverage area of cells of the second frequency layer 320 is not contiguous. However, in other embodiments one or more cells of the second frequency layer 320 may have contiguous coverage areas.

According to a first solution, cell selection is improved by a UE (i.e., one embodiment of the remote unit 105) initiating a frequency scan and/or cell search on a frequency corresponding to a frequency that it assumes (pre-configured) supports the most desired slice. Practically, this will mean that for Ultra Reliable Low-Latency Communication ("URLLC") service, the UE 205 is to start its scan at or around frequency 'f2' (for example, at/around 4.9 GHz).

In some embodiments of the first solution, the UE 205 maintains a table mapping network slices (i.e., in priority order) and corresponding frequencies. Here, a higher layer entity (e.g., NAS entity) may inform the AS layer about a frequency/slice combination that should be searched for (e.g., frequency 'f2' for the desired network slice according to the example deployment of FIG. 3). For example, the NAS layer entity may indicate that the AS layer should search for a frequency/slice combination that corresponds to a preferred network slice.

As used herein, cell selection refers to selecting a suitable cell using information gathered during cell search and/or using previously stored information. Here, the UE 205 selects the cell using cell selection criteria, such as signal strength, signal quality, service type, etc. In certain embodiments, the UE 205 performs cell selection as described in 3GPP TS 36.304.

As used herein, cell search refers to the combined procedures of detection/scanning, measurement and evaluation. Detection (also known as scanning) refers to tuning to a specific carrier frequency (e.g., 'f1' or 'f2') and identifying candidates for measurement. At the measurement phase, the UE 205 measures signal strengths, such as Reference Signal Received Power ("RSRP") and/or Reference Signal Received Quality ("RSRQ"), of the candidate cells. At the evaluation phase, the UE 205 checks the cell selection criteria using the measurement results.

According to a second solution, the UE 205 improves cell reselection by maintaining in parallel the second frequency layer 320 while the UE 205 is camping on the first frequency layer 310 (i.e., while in RRC Idle state). Here, the UE 205 performs detection, measurement, and evaluation of the second frequency layer (i.e., carrier frequency 'f2') while camped on a cell of the first frequency layer 310 (i.e., carrier frequency 'f1').

In some embodiments, the UE 205 keeps performing "virtual" reselections on the second frequency layer 320. Here, the term "virtual" is used because the UE is not yet registered on a cell of the second frequency layer 320 (recall that the UE 205 is in RRC Idle state). This means that the UE 205 internally behaves as if it is also camping on the second cell 315 and trying to reselect cells on the second frequency layer 320. However, from network perspective the UE 205 is camping on the first frequency layer 310 (i.e., the UE 205 is paged on cells of the first frequency layer 310 and only requests System Information ("SI") on Demand from a cell of the first frequency layer 310). When application data comes in for service 'x,' the UE can establish an RRC connection from the current selected (i.e., virtually camped) cell on the Second frequency layer 320. Note that establishing an RRC connection include transitioning from the RRC Idle state to a RRC Connected state.

In the above scenarios, it is assumed that the first set of network slices 311 is associated with a first group of applications and the second set of network slices 321 is associated with a second group of applications. Thus, when application data is generated by an application of the first group of application, then the UE 205 requires a connection with the first set of network slices 311 and thus performs cell selection for the first frequency layer 310 and establishes an RRC connection with the selected cell (e.g., the first cell 305). In contrast, when application data is generated by an application of the second group of application, then the UE 205 requires a connection with the second set of network slices 321 and thus performs cell selection for the second frequency layer 320 and establishes an RRC connection with the selected cell (e.g., the second cell 315).

To save power during the parallel maintenance, one or more of the following options may be adopted. According to a first power-saving option, the UE 205 may perform only a subset of the cell search tasks on the second frequency layer 320 (i.e., not all the tasks among detection, measurement, and evaluation of f2). For example, the UE 205 may only perform detection and optionally measurement of cells on the second frequency layer 320. In one embodiment, performing only the subset of cell search tasks may happen each time cell search is to be performed for the second frequency layer 320. In another embodiment, performing only the subset of cell search tasks may happen each time cell search is to be performed for the second frequency layer 320.

As another example, the UE 205 may perform cell search on the second frequency layer 320 with reduced performance. In one embodiment, performing cell search with reduced performance comprises performing cell search on the second frequency layer 320 at a longer interval (i.e., longer periodicity) that used for the first frequency layer 310. In another embodiment, performing cell search with reduced performance comprises raising a detection threshold to reduce the number of candidate cells to measure.

According to a second power-saving option, a less mobile or stationary UE 205 camps on the second frequency layer 320 instead of camping on the first frequency layer 310. Therefore, if a mobility level of the UE 205 is below a predefined mobility threshold, then the UE 205 camps on a cell of the second frequency layer 320.

According to a third option, the UE 205 determines an interval at which to perform cell search on the second frequency layer 320, e.g., determined based on a battery level or based on a power consumption level. For example, PPI (power performance tradeoff) entails the UE 205 decision, i.e., whether to 1) always do a parallel reselection (i.e., Parallel maintenance of a second frequency in RRC Idle) or, 2) only limitedly parallel reselection, e.g., depending on battery constraint.

As used herein, cell reselection refers to the UE 205 having already selected a cell and determining to performing cell selection anew, e.g., in response to a trigger condition. In one embodiment, the trigger condition is expiry of a timer. In another embodiment, the trigger condition is RSRP and/or RSRQ measurements of the current selected cell deteriorating (e.g., dropping below a threshold value). During cell reselection, the UE 205 performs the above described steps of cell selection. In certain embodiments, the UE 205 again performs cell search during the cell reselection process. In some embodiments, cell reselection may evaluate additional criteria not evaluated during the initial cell selection. In some embodiments, the UE 205 considers a cell priority when performing cell reselection.

According to a third solution, the mobile communication network (e.g., the RAN) may control the RRC Idle state UE load of a cell using a persistence check parameter. Improved cell reselection using parallel maintenance may need to be used when cell(s) on the second frequency layer 320 controls not only cell access to establish RRC Connection, but also (or only) for cell camping thus affecting the RRC Idle state UE load.

The RRC Idle state UE load can arise due to: 1) Higher number of UEs in RRC Idle would mean higher number of UEs requesting SI on Demand; 2) Higher number of UEs in RRC Idle would mean, a higher number trying to establish RRC Connection for MO (Mobile originating) calls; and/or 3) Higher number of UEs in RRC Idle would mean, a higher paging load, a higher number trying to establish RRC Connection for MT (Mobile terminating) calls The persistence check parameter is a value selected based on the RRC Idle state load. In one embodiment, the persistence check parameter is a decimal number between 0 and 1 (for example, 0.3). To mitigate the RRC Idle state UE load, a cell in the RAN may, e.g., broadcast a persistence check parameter.

At the UE-side, the cell selection/reselection procedure on a cell implementing this persistence check is modified as follows: The UE 205 generates a random value within the permitted range of the persistence check parameter (e.g., decimal number between 0 and 1) and compares the generated value to the persistence check parameter. The UE 205 selectively halts the cell selection/reselection procedure based on the comparison. In one embodiment, the UE 205 proceeds on to select/reselect this cell only when the generated random value is smaller than the broadcasted persistence check parameter. In another embodiment, the UE 205 proceeds on to select/reselect this cell only when the generated random value is larger than the broadcasted persistence check parameter.

According to a fourth solution, the UE 205 performs cell search for the second frequency layer 320 at a different interval based on the relative priority of the second frequency layer 320. For example, the UE 205 may determine that the second frequency layer 320 has a higher frequency (relative to other frequency layers of the RAN) based on a dedicated priority or on a common priority of the carrier frequency of the second frequency layer (i.e., 'f2'). Regarding dedicated priority, during release of UE radio resources, the RRC Connection Release message provides the radio resources for the UE 205 (i.e., in IdleModeMobilityControlInfo Information Element ("IE")).

Regarding common priority, the priority of the serving frequency may be specified and broadcast by the RAN in system information (e.g., in System Information Block ("SIB") 3). The priority of a non-serving frequency may be specified and broadcast in SIB 5, while priorities of frequencies using a different RAT may be broadcast in another SIB (e.g., SIB 6, SIB 7 and/or SIB 8). As applied to the example deployment of FIG. 3, the UE 205 camping on the first cell 305 may identity a priority of the first frequency layer 310 from SIB3 and identify a priority of the second frequency layer 320 from SIB5.

In various embodiments, the second frequency layer 320 may have a greater relative priority. Accordingly, the UE 205 may perform the cell search procedure (or a portion thereof) at a higher interval for higher priority frequency. In one embodiment, the UE 205 performs cell search for the higher priority frequency layer at least every $T_{higher\_priority\_search} = (60 \times N_{layers})$ seconds.

Further, the UE 205 may know that the second frequency layer 320 (i.e., 'f2') supports its preferred/desired slice (e.g., based on the stored information, or the network may inform the same to the UE). Thus, the UE 205 knowing that the second frequency layer 320 supports its preferred slice, searches that frequency layer (F2) more often than done for other frequency layers. In one embodiment, cell search among frequency layers F2, F3, and F4 occurs according to a pattern that increases how often the preferred frequency layer (i.e., F2) is search. For example, the search order may be <F2, F3, F2, F4, F2, F3> and so on, instead of <F2, F3, F4, F2, F3, F4> and so on. In a further variation of this solution, one or more frequencies associated with non-desired-slice may be deprioritized or omitted from inter-frequency reselection.

According to a fifth solution, the dedicated or cell common priorities may configure the second frequency layer 320 to be of lower priority. In some embodiments, the UE is informed by the network that the second frequency layer 320 supports a preferred/desired slice. In other embodiments, the UE 205 knows that that the second frequency layer 320 supports a preferred/desired slice based on stored information. Here, the UE 205 performs inter-frequency reselection to look for such a cell of the second frequency layer 320 even when the camped cell (i.e., the first cell 305) stays above quality thresholds.

Figure 4:
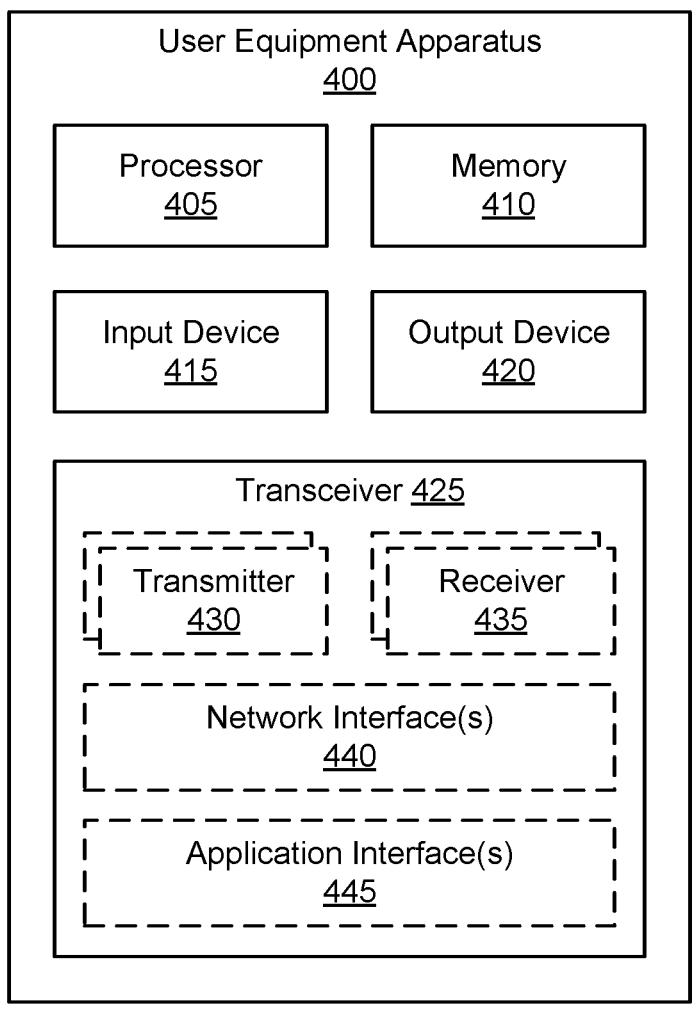
FIG. 4 is a diagram illustrating one embodiment of a user equipment apparatus that may be used for performing cell selection/reselection on a radio frequency associated with a network slice.

FIG. 4 depicts a user equipment apparatus 400 that may be used for performing cell selection/reselection on a carrier frequency associated with a network slice, according to embodiments of the disclosure. In various embodiments, the user equipment apparatus 400 is used to implement one or more of the solutions described above. The user equipment apparatus 400 may be one embodiment of the remote unit 105 and/or the UE 205, described above. Furthermore, the user equipment apparatus 400 may include a processor 405, a memory 410, an input device 415, an output device 420, and a transceiver 425.

In some embodiments, the input device 415 and the output device 420 are combined into a single device, such as a touchscreen. In certain embodiments, the user equipment apparatus 400 may not include any input device 415 and/or output device 420. In various embodiments, the user equipment apparatus 400 may include one or more of: the processor 405, the memory 410, and the transceiver 425, and may not include the input device 415 and/or the output device 420.

As depicted, the transceiver 425 includes at least one transmitter 430 and at least one receiver 435. In some embodiments, the transceiver 425 communicates with one or more cells (or wireless coverage areas) supported by one or more base units 121. In various embodiments, the transceiver 425 is operable on unlicensed spectrum. Moreover, the transceiver 425 may include multiple UE panels supporting one or more beams. Additionally, the transceiver 425 may support at least one network interface 440 and/or application interface 445. The application interface(s) 445 may support one or more APIs. The network interface(s) 440 may support 3GPP reference points, such as Uu, N1, PC5, etc. Other network interfaces 440 may be supported, as understood by one of ordinary skill in the art.

The processor 405, in one embodiment, may include any known controller capable of executing computer-readable instructions and/or capable of performing logical operations. For example, the processor 405 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 405 executes instructions stored in the memory 410 to perform the methods and routines described herein. The processor 405 is communicatively coupled to the memory 410, the input device 415, the output device 420, and the transceiver 425.

In various embodiments, the processor 405 controls the user equipment apparatus 400 to implement the above described UE behaviors. In certain embodiments, the processor 405 may include an application processor (also known as "main processor") which manages application-domain and operating system ("OS") functions and a baseband processor (also known as "baseband radio processor") which manages radio functions.

In various embodiments, the processor 405 controls the user equipment apparatus 400 to implement the above described UE behaviors. For example, the processor 405 may control the transceiver 425 to camp on a first frequency layer of a RAN while in a RRC Idle state, where the first frequency layer supporting a first set of network slices. Additionally, the processor 405 iteratively performs cell search on a second frequency layer while being camped on the first frequency layer, the second frequency layer supporting a second set of network slices. Here, the apparatus 400 is configured to use the first set of network slices and the second set of network slices, where the first set of network slices is prioritized for use with a first frequency (i.e., corresponding to the first frequency layer) and the second set of network slices is prioritized for use with a second frequency (i.e., corresponding to the second frequency layer).

The processor 405 maintains in parallel the second frequency layer while in the RRC Idle state by performing cell reselection on the second frequency. In some embodiments, maintaining in parallel the second frequency layer includes maintaining (e.g., continually monitoring and evaluating for cell reselection) both the first frequency layer and the second frequency layer. In certain embodiments, maintaining in parallel the second frequency layer includes performing "virtual" reselection for the second frequency layer, as described above.

In some embodiments, the first set of network slices is associated with a first group of applications and the second set of network slices is associated with a second group of applications. In certain embodiments, the first frequency layer comprises a set of one or more first cells (or cell sectors) in the RAN that operate on the first frequency. In certain embodiments, the second frequency layer comprises a set of one or more second cells (or cell sectors) in the RAN that operate on the second frequency.

In some embodiments, the processor 405 iteratively performs cell search on the second frequency layer while camped on the first frequency layer by performing cell search on the second frequency layer at reduced performance as compared to the performance of cell search on the first frequency layer. Note that performing cell search for a particular frequency layer may include performing steps of detection, measurement and evaluation of cells on the particular frequency layer. In one embodiment, the processor 405 iteratively performs cell search on the second frequency layer at reduced performance by performing cell search on the second frequency layer at a longer interval (i.e., less often) that used for the first frequency layer. In another embodiment, processor 405 iteratively performs cell search on the second frequency layer at reduced performance by skipping the evaluation step for one or more iterations of cell search on the second frequency layer.

In some embodiments, the processor 405 determines an interval for performing cell search on the second frequency layer while being camped on the first frequency layer, said interval determined based on a battery level of the apparatus 400 or based on a power consumption level of the apparatus 400. In some embodiments, the processor 405 controls the transceiver 425 to camp on the second frequency layer instead of the first frequency layer in response to a mobility level of the apparatus 400 being below a predefined mobility threshold.

In some embodiments, the processor 405 determines that the second frequency layer has a higher priority than other frequency layers of the RAN and, in response, performs optimized cell search on the second frequency layer by using a shorter interval than a search interval associated with the lower priority frequency layers of the RAN. In certain embodiments, the processor 405 further excludes from consideration for inter-frequency reselection one or more frequency layers that are not associated with a preferred slice.

In some embodiments, the processor 405 determines that the second frequency is of a lower priority, e.g., based on a dedicated priority for the second frequency or on a common priority for the second frequency. In such embodiments, the processor 405 may perform inter-frequency reselection for the second frequency even when a quality level of the first frequency satisfies a quality threshold.

In some embodiments, the processor 405 maintains a prioritized table that maps network slices to corresponding frequencies and initiates a frequency scan for the second frequency while camped on the first frequency layer. In such embodiments, a NAS layer entity in the apparatus 400 may notify an AS layer entity in the apparatus 400 to search for a particular combination of frequency and network slice, said combination corresponding to a preferred network slice.

In some embodiments, the processor 405 detects a request to establish a data connection with a network slice of the second set of network slices and establishes a RRC connection with a cell on the second frequency layer in response to detecting the request. In such embodiments, the request may be generated by an application running on the apparatus 400 and/or generated by an operating system of the apparatus 400.

In various embodiments, the transceiver 425 receives a broadcast message comprising a persistence check value for a cell. Thereafter, during a cell reselection procedure the processor 405 may generate a random value and compare the generated random value to the received persistence check value. Based on a result of the comparison, the processor 405 selectively stops the cell reselection procedure.

In certain embodiments, the processor 405 selectively stops the cell reselection based on a result of the comparison by proceeding with the cell reselection in response to the generated random value being less than the received persistence check value. Otherwise, the processor 405 stops the cell reselection procedure (i.e., terminates the procedure without selecting/reselecting a cell) if the generated random value is less not than the received persistence check value. In an alternate embodiment, the processor 405 may continue/complete the cell reselection procedure when the generated random value is greater than the received persistence check value and terminate the cell reselection procedure when the generated random value is not greater than the received persistence check value.

In some embodiments, the persistence check value is selected based on a RRC Idle state UE load of the first cell. In some embodiments, the persistence check value is configured by the mobile communication network using RRC signaling.

The memory 410, in one embodiment, is a computer readable storage medium. In some embodiments, the memory 410 includes volatile computer storage media. For example, the memory 410 may include a RAM, including dynamic RAM ("DRAM"), synchronous dynamic RAM ("SDRAM"), and/or static RAM ("SRAM"). In some embodiments, the memory 410 includes non-volatile computer storage media. For example, the memory 410 may include a hard disk drive, a flash memory, or any other suitable non-volatile computer storage device. In some embodiments, the memory 410 includes both volatile and non-volatile computer storage media.

In some embodiments, the memory 410 stores data related to cell selection/reselection on a carrier frequency associated with a network slice. For example, the memory 410 may store various parameters, panel/beam configurations, resource assignments, policies, and the like as described above. In certain embodiments, the memory 410 also stores program code and related data, such as an operating system or other controller algorithms operating on the apparatus 400.

The input device 415, in one embodiment, may include any known computer input device including a touch panel, a button, a keyboard, a stylus, a microphone, or the like. In some embodiments, the input device 415 may be integrated with the output device 420, for example, as a touchscreen or similar touch-sensitive display. In some embodiments, the input device 415 includes a touchscreen such that text may be input using a virtual keyboard displayed on the touch-screen and/or by handwriting on the touchscreen. In some embodiments, the input device 415 includes two or more different devices, such as a keyboard and a touch panel.

The output device 420, in one embodiment, is designed to output visual, audible, and/or haptic signals. In some embodiments, the output device 420 includes an electroni-cally controllable display or display device capable of outputting visual data to a user. For example, the output device 420 may include, but is not limited to, a Liquid Crystal Display ("LCD"), a Light-Emitting Diode ("LED") display, an Organic LED ("OLED") display, a projector, or similar display device capable of outputting images, text, or the like to a user. As another, non-limiting, example, the output device 420 may include a wearable display separate from, but communicatively coupled to, the rest of the user equipment apparatus 400, such as a smart watch, smart glasses, a heads-up display, or the like. Further, the output device 420 may be a component of a smart phone, a personal digital assistant, a television, a table computer, a notebook (laptop) computer, a personal computer, a vehicle dash-board, or the like.

In certain embodiments, the output device 420 includes one or more speakers for producing sound. For example, the output device 420 may produce an audible alert or notifi-cation (e.g., a beep or chime). In some embodiments, the output device 420 includes one or more haptic devices for producing vibrations, motion, or other haptic feedback. In some embodiments, all or portions of the output device 420 may be integrated with the input device 415. For example, the input device 415 and output device 420 may form a touchscreen or similar touch-sensitive display. In other embodiments, the output device 420 may be located near the input device 415.

The transceiver 425 communicates with one or more network functions of a mobile communication network via one or more access networks. The transceiver 425 operates under the control of the processor 405 to transmit messages, data, and other signals and also to receive messages, data, and other signals. For example, the processor 405 may selectively activate the transceiver 425 (or portions thereof) at particular times in order to send and receive messages.

The transceiver 425 includes at least transmitter 430 and at least one receiver 435. One or more transmitters 430 may be used to provide UL communication signals to a base unit 121, such as the UL transmissions described herein. Simi-larly, one or more receivers 435 may be used to receive DL communication signals from the base unit 121, as described herein. Although only one transmitter 430 and one receiver 435 are illustrated, the user equipment apparatus 400 may have any suitable number of transmitters 430 and receivers 435. Further, the transmitter(s) 430 and the receiver(s) 435 may be any suitable type of transmitters and receivers. In one embodiment, the transceiver 425 includes a first trans-mitter/receiver pair used to communicate with a mobile communication network over licensed radio spectrum and a second transmitter/receiver pair used to communicate with a mobile communication network over unlicensed radio spec-trum.

In certain embodiments, the first transmitter/receiver pair used to communicate with a mobile communication network over licensed radio spectrum and the second transmitter/receiver pair used to communicate with a mobile commu-nication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 425, transmitters 430, and receivers 435 may be implemented as physically separate components that access a shared hardware resource and/or software resource, such as for example, the network inter-face 440.

In various embodiments, one or more transmitters 430 and/or one or more receivers 435 may be implemented and/or integrated into a single hardware component, such as a multi-transceiver chip, a system-on-a-chip, an Application Specific Integrated Circuit ("ASIC"), or other type of hard-ware component. In certain embodiments, one or more transmitters 430 and/or one or more receivers 435 may be implemented and/or integrated into a multi-chip module. In some embodiments, other components such as the network interface 440 or other hardware components/circuits may be integrated with any number of transmitters 430 and/or receivers 435 into a single chip. In such embodiment, the transmitters 430 and receivers 435 may be logically config-ured as a transceiver 425 that uses one more common control signals or as modular transmitters 430 and receivers 435 implemented in the same hardware chip or in a multi-chip module.

Figure 5:
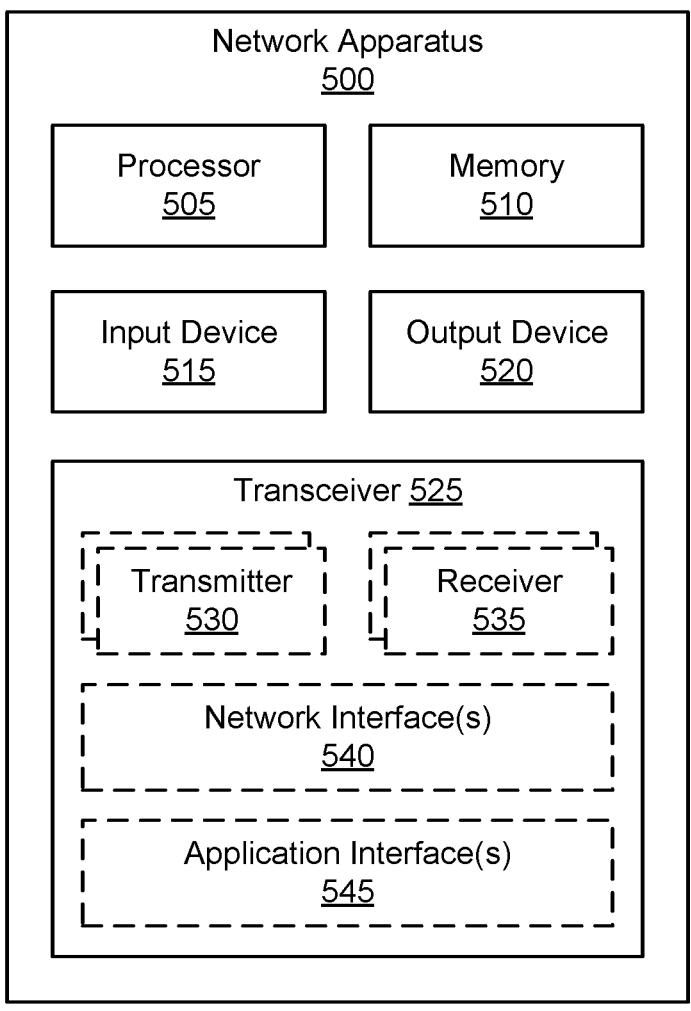
FIG. 5 is a diagram illustrating one embodiment of a network apparatus that may be used for performing cell selection/reselection on a radio frequency associated with a network slice.

FIG. 5 depicts a network apparatus 500 that may be used for performing cell selection/reselection on a carrier fre-quency associated with a network slice, according to embodiments of the disclosure. In one embodiment, network apparatus 500 may be one implementation of a RAN node, such as the base unit 121 and/or the RAN node 210, as described above. Furthermore, the base network apparatus 500 may include a processor 505, a memory 510, an input device 515, an output device 520, and a transceiver 525.

In some embodiments, the input device 515 and the output device 520 are combined into a single device, such as a touchscreen. In certain embodiments, the network apparatus 500 may not include any input device 515 and/or output device 520. In various embodiments, the network apparatus 500 may include one or more of: the processor 505, the memory 510, and the transceiver 525, and may not include the input device 515 and/or the output device 520.

As depicted, the transceiver 525 includes at least one transmitter 530 and at least one receiver 535. Here, the transceiver 525 communicates with one or more remote units 55. Additionally, the transceiver 525 may support at least one network interface 540 and/or application interface 545. The application interface(s) 545 may support one or more APIs. The network interface(s) 540 may support 3GPP reference points, such as Uu, N1, N2 and N3. Other network interfaces 540 may be supported, as understood by one of ordinary skill in the art.

The processor 505, in one embodiment, may include any known controller capable of executing computer-readable instructions and/or capable of performing logical operations. For example, the processor 505 may be a microcontroller, a microprocessor, a CPU, a GPU, an auxiliary processing unit, a FPGA, or similar programmable controller. In some embodiments, the processor 505 executes instructions stored in the memory 510 to perform the methods and routines described herein. The processor 505 is communicatively coupled to the memory 510, the input device 515, the output device 520, and the transceiver 525.

In various embodiments, the network apparatus 500 is a RAN node (e.g., gNB) that communicates with one or more UEs, as described herein. In such embodiments, the processor 505 controls the network apparatus 500 to perform the above described RAN behaviors. When operating as a RAN node, the processor 505 may include an application processor (also known as "main processor") which manages application-domain and operating system ("OS") functions and a baseband processor (also known as "baseband radio processor") which manages radio functions.

In various embodiments, the network apparatus 500 provides one or more cells on one or more frequency layers. In some embodiments, the processor 505 may configure the UE to use a first set of network slices and a second set of network slices, where the first set of network slices is prioritized for use with a first frequency and the second set of network slices is prioritized for use with a second frequency. Note that the processor 505 may control the transceiver 525 to provide a first cell that operates on the first frequency and/or a second cell that operates on the second frequency. As described above, a first frequency layer comprising one or more first cells operating on the first frequency) may support the first set of network slices, while a second frequency layer (i.e., comprising one or more second cells operating on the second frequency) may support the second set of network slices.

In some embodiments, the processor 505 may control the transceiver 525 to broadcast a message in a cell, said message comprising a persistence check value for the cell. Here, the processor 505 may select the persistence check value based on a RRC idle state UE load of the cell where the message is broadcast.

The memory 510, in one embodiment, is a computer readable storage medium. In some embodiments, the memory 510 includes volatile computer storage media. For example, the memory 510 may include a RAM, including dynamic RAM ("DRAM"), synchronous dynamic RAM ("SDRAM"), and/or static RAM ("SRAM"). In some embodiments, the memory 510 includes non-volatile computer storage media. For example, the memory 510 may include a hard disk drive, a flash memory, or any other suitable non-volatile computer storage device. In some embodiments, the memory 510 includes both volatile and non-volatile computer storage media.

In some embodiments, the memory 510 stores data related to cell selection/reselection on a carrier frequency associated with a network slice. For example, the memory 510 may store parameters, configurations, resource assignments, policies, and the like, as described above. In certain embodiments, the memory 510 also stores program code and related data, such as an operating system or other controller algorithms operating on the apparatus 500.

The input device 515, in one embodiment, may include any known computer input device including a touch panel, a button, a keyboard, a stylus, a microphone, or the like. In some embodiments, the input device 515 may be integrated with the output device 520, for example, as a touchscreen or similar touch-sensitive display. In some embodiments, the input device 515 includes a touchscreen such that text may be input using a virtual keyboard displayed on the touchscreen and/or by handwriting on the touchscreen. In some embodiments, the input device 515 includes two or more different devices, such as a keyboard and a touch panel.

The output device 520, in one embodiment, is designed to output visual, audible, and/or haptic signals. In some embodiments, the output device 520 includes an electronically controllable display or display device capable of outputting visual data to a user. For example, the output device 520 may include, but is not limited to, an LCD display, an LED display, an OLED display, a projector, or similar display device capable of outputting images, text, or the like to a user. As another, non-limiting, example, the output device 520 may include a wearable display separate from, but communicatively coupled to, the rest of the network apparatus 500, such as a smart watch, smart glasses, a heads-up display, or the like. Further, the output device 520 may be a component of a smart phone, a personal digital assistant, a television, a table computer, a notebook (laptop) computer, a personal computer, a vehicle dashboard, or the like.

In certain embodiments, the output device 520 includes one or more speakers for producing sound. For example, the output device 520 may produce an audible alert or notification (e.g., a beep or chime). In some embodiments, the output device 520 includes one or more haptic devices for producing vibrations, motion, or other haptic feedback. In some embodiments, all or portions of the output device 520 may be integrated with the input device 515. For example, the input device 515 and output device 520 may form a touchscreen or similar touch-sensitive display. In other embodiments, the output device 520 may be located near the input device 515.

The transceiver 525 includes at least transmitter 530 and at least one receiver 535. One or more transmitters 530 may be used to communicate with the UE, as described herein. Similarly, one or more receivers 535 may be used to communicate with network functions in a Public Land Mobile Network ("PLMN") and/or RAN, as described herein. Although only one transmitter 530 and one receiver 535 are illustrated, the network apparatus 500 may have any suitable number of transmitters 530 and receivers 535. Further, the transmitter(s) 530 and the receiver(s) 535 may be any suitable type of transmitters and receivers.

Figure 6:
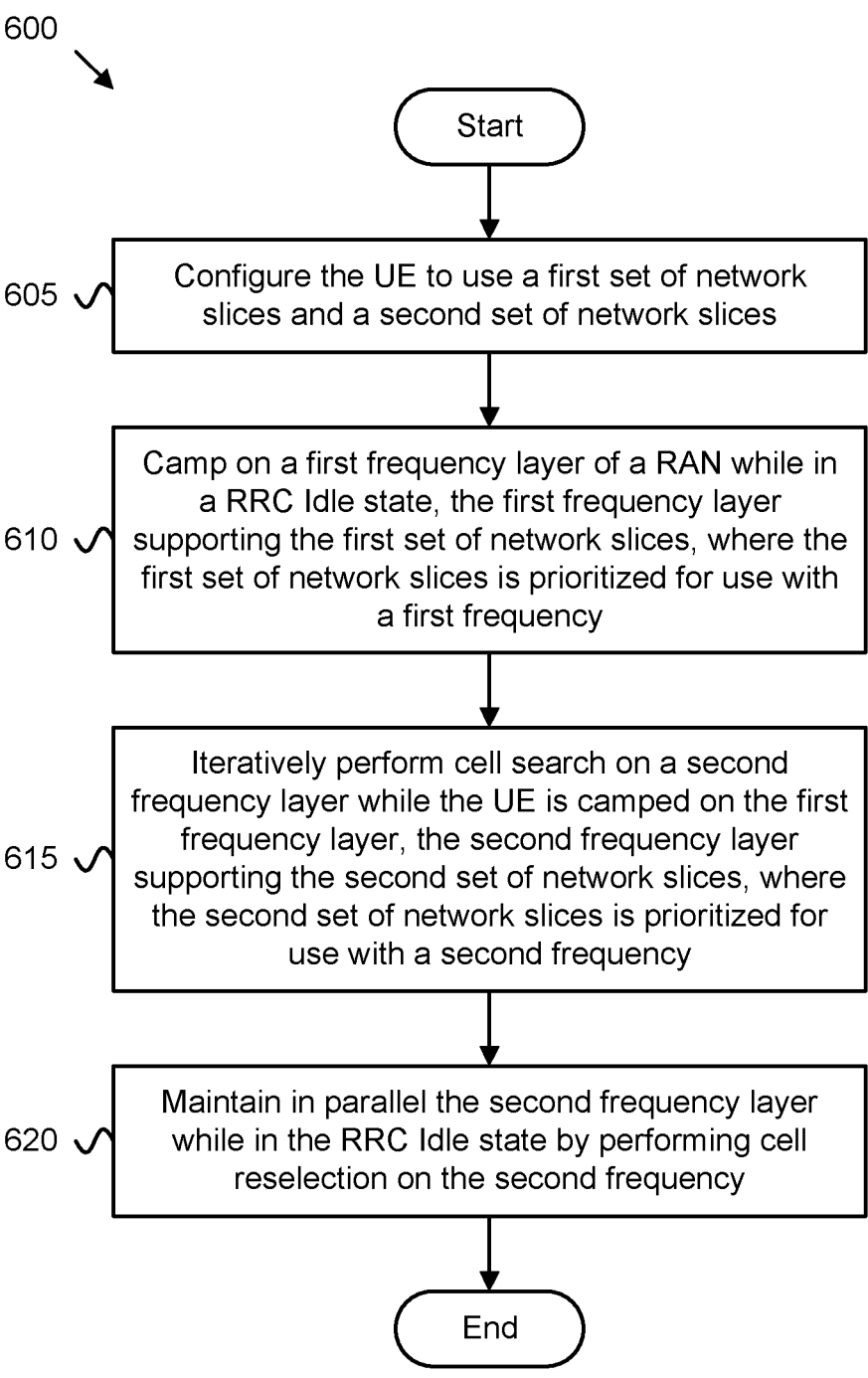
FIG. 6 is a flowchart diagram illustrating one embodiment of a first method for parallel maintenance of a second frequency layer.

FIG. 6 depicts one embodiment of a method 600 for parallel maintenance of a second frequency layer, according to embodiments of the disclosure. In various embodiments, the method 600 is performed by a user equipment device in a mobile communication network, such as the remote unit 105, the UE 205, and/or the user equipment apparatus 400, described above. In some embodiments, the method 600 is performed by a processor, such as a microcontroller, a microprocessor, a CPU, a GPU, an auxiliary processing unit, a FPGA, or the like.

The method 600 begins and configures 605 the UE to use a first set of network slices and a second set of network slices. The method 600 includes camping 610 on a first frequency layer of a RAN while in a RRC Idle state, the first frequency layer supporting the first set of network slices, where the first set of network slices is prioritized for use with a first frequency. The method 600 includes iteratively performing 615 cell search on a second frequency layer while the UE is camped on the first frequency layer, the second frequency layer supporting the second set of network slices, where the second set of network slices is prioritized for use with a second frequency. The method 600 includes maintaining in parallel 620 the second frequency layer while in the RRC Idle state by performing cell reselection on the second frequency. The method 600 ends.

Figure 7:
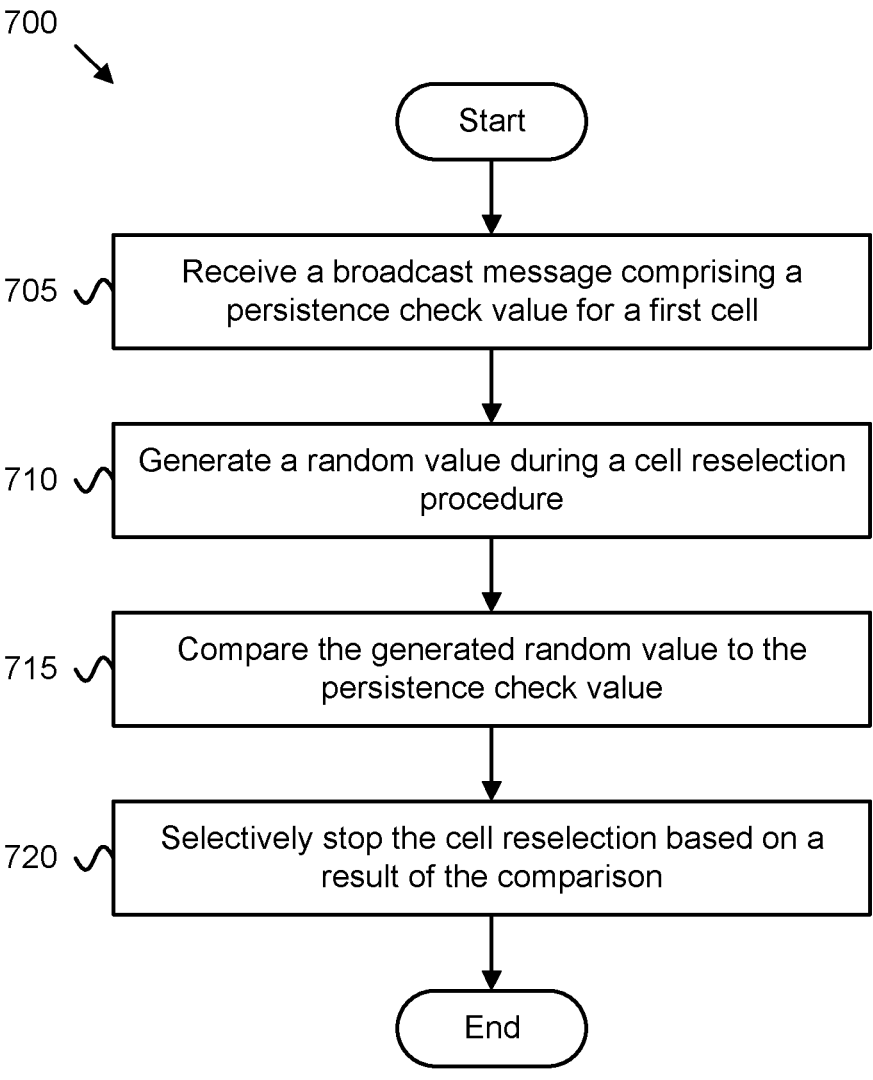
FIG. 7 is a flowchart diagram illustrating one embodiment of a first method for cell reselection using a persistence check value.

FIG. 7 depicts one embodiment of a method 700 for cell reselection using a persistence check value, according to embodiments of the disclosure. In various embodiments, the method 700 is performed by a user equipment device in a mobile communication network, such as the remote unit 105, the UE 205, and/or the user equipment apparatus 400, described above. In some embodiments, the method 700 is performed by a processor, such as a microcontroller, a microprocessor, a CPU, a GPU, an auxiliary processing unit, a FPGA, or the like.

The method 700 begins and receives 705 a broadcast message comprising a persistence check value for a first cell. The method 700 includes generating 710 a random value during a cell reselection procedure. The method 700 includes comparing 715 the generated random value to the persistence check value. The method 700 includes selectively stopping 720 the cell reselection based on a result of the comparison. The method 700 ends.

Disclosed herein is a first apparatus for performing cell selection/reselection on a radio carrier frequency associated with a network slice, according to embodiments of the disclosure. The first apparatus may be implemented by a user equipment device in a mobile communication network, such as the remote unit 105, the UE 205, and/or the user equipment apparatus 400, as described above. The first apparatus includes a processor and a transceiver that camps on a first frequency layer of a RAN while in a RRC Idle state, the first frequency layer supporting a first set of network slices. The processor iteratively performs cell search on a second frequency layer while the apparatus is camped on the first frequency layer, the second frequency layer supporting a second set of network slices. Here, the first apparatus is configured to use the first set of network slices and the second set of network slices, where the first set of network slices is prioritized for use with a first frequency (i.e., corresponding to the first frequency layer) and the second set of network slices is prioritized for use with a second frequency (i.e., corresponding to the second frequency layer). The processor maintains in parallel the second frequency layer while in the RRC Idle state by performing cell reselection on the second frequency.

In some embodiments, the first set of network slices is associated with a first group of applications and the second set of network slices is associated with a second group of applications. In certain embodiments, the first frequency layer comprises a set of one or more first cells (or cell sectors) in the RAN that operate on the first frequency. In certain embodiments, the second frequency layer comprises a set of one or more second cells (or cell sectors) in the RAN that operate on the second frequency.

In some embodiments, iteratively performing cell search on the second frequency layer while camped on the first frequency layer includes performing detection, measurement and evaluation of cells on the second frequency layer at reduced performance as compared to detection, measurement and evaluation of cells on the first frequency layer. In one embodiment, performing the above at reduced performance means performing at a longer interval. In another embodiment, performing at reduced performance means skipping the evaluation step for one or more iterations.

In some embodiments, the processor determines an interval for performing cell search on the second frequency layer while the apparatus is camped on the first frequency layer, said interval determined based on a battery level of the apparatus or based on a power consumption level of the apparatus. In some embodiments, the processor controls the transceiver to camp on the second frequency layer instead of the first frequency layer in response to a mobility level of the apparatus being below a predefined mobility threshold.

In some embodiments, the processor determines that the second frequency layer has a higher priority than other frequency layers of the RAN and performs optimized cell search on the second frequency layer by using a shorter interval than a search interval associated with the lower priority frequency layers of the RAN. In certain embodiments, the processor further excludes from consideration for inter-frequency reselection one or more frequency layers that are not associated with a preferred slice.

In some embodiments, the processor determines that the second frequency is of a lower priority, e.g., based on a dedicated priority for the second frequency or on a common priority for the second frequency. In such embodiments, the processor performs inter-frequency reselection for the second frequency even when a quality level of the first frequency satisfies a quality threshold.

In some embodiments, the processor maintains a prioritized table that maps network slices to corresponding frequencies and initiates a frequency scan for the second frequency while camped on the first frequency layer. In such embodiments, a NAS layer entity in the apparatus may notify an AS layer entity in the apparatus to search for a particular combination of frequency and network slice, said combination corresponding to a preferred network slice.

In some embodiments, the processor detects a request to establish a data connection with a network slice of the second set of network slices and establishes a RRC connection with a cell on the second frequency layer in response to detecting the request. In such embodiments, the request may be generated by one of: an application running on the apparatus and an operating system of the apparatus.

In some embodiments, maintaining in parallel the second frequency layer includes monitoring both the first and second frequency layers and evaluating the first and second frequency layers for cell reselection. In certain embodiments, maintaining in parallel the second frequency layer includes performing virtual reselection for the second frequency layer.

Disclosed herein is a first method for performing cell selection/reselection on a radio carrier frequency associated with a network slice, according to embodiments of the disclosure. The first method may be performed by a user equipment device in a mobile communication network, such as the remote unit 105, the UE 205, and/or the user equipment apparatus 400, as described above. The first method includes configuring the UE to use a first set of network slices and a second set of network slices and camping on a first frequency layer of a RAN while in a RRC Idle state, the first frequency layer supporting the first set of network slices, wherein the first set of network slices is prioritized for use with a first frequency. The first method includes iteratively performing cell search on a second frequency layer while the UE is camped on the first frequency layer, the second frequency layer supporting the second set of network slices, wherein the second set of network slices is prioritized for use with a second frequency. The first method includes maintaining in parallel the second frequency layer while in the RRC Idle state by performing cell reselection on the second frequency.

In some embodiments, the first set of network slices is associated with a first group of applications and the second set of network slices is associated with a second group of applications. In certain embodiments, the first frequency layer comprises a set of one or more first cells (or cell sectors) in the RAN that operate on the first frequency. In certain embodiments, the second frequency layer comprises a set of one or more second cells (or cell sectors) in the RAN that operate on the second frequency. As described above, the first set of network slices is prioritized for use with the first frequency and the second set of network slices is prioritized for use with the second frequency.

In some embodiments, iteratively performing cell search on the second frequency layer while the UE is camped on the first frequency layer comprises performing detection, measurement and evaluation of cells on the second frequency layer at reduced performance as compared to detection, measurement and evaluation of cells on the first frequency layer. In one embodiment, performing the above at reduced performance means performing at a longer interval. In another embodiment, performing the above at reduced performance means skipping the evaluation step for one or more iterations.

In some embodiments, the first method further includes determining an interval at which the UE performs cell search on the second frequency layer while the UE is camped on the first frequency layer, said interval determined based on a battery level of the UE or based on a power consumption level of the UE. In some embodiments, the first method further includes camping on the second frequency layer instead of on the first frequency layer in response to a mobility level of the UE being below a predefined mobility threshold.

In some embodiments, the first method further includes determining that the second frequency layer has a higher priority than other frequency layers of the RAN and performing cell search on the second frequency layer at a shorter interval than a search interval associated with the lower priority frequency layers of the RAN. In such embodiments, the first method may also include excluding frequency layers that are not associated with a preferred slice from consideration for inter-frequency reselection.

In some embodiments, the first method further includes determining that the second frequency is of a lower priority based on a dedicated priority for the second frequency or based on a common priority for the second frequency. In such embodiments, the first method includes performing inter-frequency reselection for the second frequency even while a quality level of the first frequency satisfies a quality threshold.

In some embodiments, the first method further includes maintaining a prioritized table that maps network slices to corresponding frequencies and initiating, at the UE, a frequency scan for the second frequency while camped on the first frequency layer. In certain embodiments, a NAS layer entity in the UE notifies an AS layer entity in the UE to search for a particular combination of frequency and network slice, said combination corresponding to a preferred network slice.

In some embodiments, the first method further includes detecting a request to establish a data connection with a network slice of the second set of network slices and establishing a RRC connection with a cell on the second frequency layer in response to detecting the request. In such embodiments, the request is generated by one of: an application running on the UE and an operating system of the UE.

In some embodiments, maintaining in parallel the second frequency layer includes monitoring both the first and second frequency layers and evaluating the first and second frequency layers for cell reselection. In certain embodiments, maintaining in parallel the second frequency layer includes performing virtual reselection for the second frequency layer.

Disclosed herein is a second apparatus for cell reselection using a persistence check value, according to embodiments of the disclosure. The second apparatus may be implemented by a user equipment device in a mobile communication network, such as the remote unit 105, the UE 205, and/or the user equipment apparatus 400, as described above. The second apparatus includes a processor and a transceiver that receives a broadcast message comprising a persistence check value for a cell. The processor generates a random value during a cell reselection procedure, compares the generated random value to the persistence check value, and selectively stops the cell reselection based on a result of the comparison.

In some embodiments, selectively stopping the cell reselection based on a result of the comparison includes proceeding with the cell reselection in response to the generated random value being less than the received persistence check value. In response to the generated random value not being less than the received persistence check value, the processor stops the cell reselection.

In some embodiments, the persistence check value is selected based on a RRC Idle state UE load of the first cell. In some embodiments, the persistence check value is configured by the mobile communication network using RRC signaling.

Disclosed herein is a second method for cell reselection using a persistence check value, according to embodiments of the disclosure. The second method may be performed by a user equipment device in a mobile communication network, such as the remote unit 105, the UE 205, and/or the user equipment apparatus 400, as described above. The second method includes receiving a broadcast message comprising a persistence check value for a first cell and generating a random value during a cell reselection procedure. The second method includes comparing the generated random value to the persistence check value and selectively stopping the cell reselection based on a result of the comparison.

In some embodiments, selectively stopping the cell reselection based on a result of the comparison includes proceeding with the cell reselection in response to the generated random value being less than the received persistence check value. In response to the generated random value not being less than the received persistence check value, the second method includes stopping the cell reselection.

In some embodiments, the persistence check value is selected based on a RRC Idle state UE load of the first cell. In some embodiments, the persistence check value is configured by the mobile communication network using RRC signaling.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a user equipment (UE), the method comprising:

camping on a first frequency of a radio access network (RAN) while in a radio resource control (RRC) idle state, wherein a first frequency layer supports a first set of network slices, and wherein the first set of network slices is prioritized for the first frequency;

performing cell search on a second frequency while the UE is camped on the first frequency by performing detection, measurement and evaluation operations on cells on a second frequency layer at reduced performance as compared to detection, measurement and evaluation operations on cells on the first frequency layer, wherein the second frequency layer supports a second set of network slices, and wherein the second set of network slices is prioritized for the second frequency; and performing cell reselection on the second frequency.

2. The method of claim 1, wherein the first set of network slices is associated with a first group of applications and the second set of network slices is associated with a second group of applications.

3. The method of claim 1, further comprising determining an interval at which the UE performs cell search on the second frequency layer while the UE is camped on the first frequency layer, said interval determined based on: a battery level of the UE, a power consumption level of the UE, or a combination thereof.

4. The method of claim 1, further comprising:

determining that the second frequency layer has a higher priority than other frequency layers of the RAN; and performing optimized cell search on the second frequency layer by using a shorter interval than a search interval associated with the other frequency layers of the RAN.

5. The method of claim 4, further comprising excluding frequency layers that are not associated with a preferred slice from consideration for inter-frequency reselection.

6. The method of claim 1, further comprising:

determining that the second frequency is of a lower priority based on one of: a dedicated priority for the second frequency or a common priority for the second frequency; and performing inter-frequency reselection for the second frequency even when a quality level of the first frequency satisfies a quality threshold.

7. The method of claim 1, further comprising:

maintaining a prioritized table that maps network slices to corresponding frequencies; and initiating, at the UE, a frequency scan for the second frequency while camped on the first frequency layer.

8. The method of claim 7, wherein a non-access stratum (NAS) layer entity in the UE notifies an access stratum (AS) layer entity in the UE to search for a particular combination of frequency and network slice, the combination corresponding to a preferred network slice.

9. The method of claim 1, further comprising:

detecting a request to establish a data connection with a network slice of the second set of network slices; and establishing a RRC connection with a cell on the second frequency layer in response to detecting the request, wherein the request is generated by: an application running on the UE, an operating system of the UE, or a combination thereof.

10. The method of claim 1, wherein performing cell reselection on the second frequency comprises monitoring both the first and second frequency layers in parallel and evaluating both the first and second frequency layers for cell reselection.

11. The method of claim 10, wherein performing cell reselection on the second frequency comprises performing a virtual reselection for the second frequency layer.

12. A user equipment (UE) for wireless communication, comprising:

a memory; and a processor coupled with the memory and configured to cause the UE to:

camp on a first frequency of a radio access network (RAN) while in a radio resource control (RRC) idle state, wherein a first frequency layer supports a first set of network slices, and wherein the first set of network slices is prioritized for the first frequency;

perform cell search on a second frequency while the UE is camped on the first frequency by performing detection, measurement and evaluation operations on cells on a second frequency layer at reduced performance as compared to detection, measurement and evaluation operations on cells on the first frequency layer, wherein the second frequency layer supports a second set of network slices, and wherein the second set of network slices is prioritized for use with a second frequency; and perform cell reselection on the second frequency.

13. The UE of claim 12, wherein the first set of network slices is associated with a first group of applications and the second set of network slices is associated with a second group of applications.

14. The UE of claim 12, wherein the processor is configured to cause the UE to determine an interval at which the UE performs cell search on the second frequency layer while the UE is camped on the first frequency layer, said interval determined based on: a battery level of the UE, a power consumption level of the UE, or a combination thereof.

15. The UE of claim 12, wherein the processor is configured to cause the UE to:

determine that the second frequency layer has a higher priority than other frequency layers of the RAN; and perform optimized cell search on the second frequency layer by using a shorter interval than a search interval associated with the other frequency layers of the RAN.

16. The UE of claim 12, wherein the processor is configured to cause the UE to:

determine that the second frequency is of a lower priority based on one of: a dedicated priority for the second frequency or a common priority for the second frequency; and perform inter-frequency reselection for the second frequency even when a quality level of the first frequency satisfies a quality threshold.

17. The UE of claim 12, wherein the processor is configured to cause the UE to:

maintain a prioritized table that maps network slices to corresponding frequencies; and initiate a frequency scan for the second frequency while camped on the first frequency layer.

18. The UE of claim 12, wherein the processor is configured to cause the UE to:

detect a request to establish a data connection with a network slice of the second set of network slices; and establish a RRC connection with a cell on the second frequency layer in response to detecting the request, wherein the request is generated by: an application running on the UE, an operating system of the UE, or a combination thereof.

* * * * *